United States Patent
Kumaresan et al.

(10) Patent No.: US 8,068,409 B2
(45) Date of Patent: Nov. 29, 2011

(54) FAST OSPF INACTIVE ROUTER DETECTION

(75) Inventors: Pramod J. Kumaresan, Santa Clara, CA (US); Cynthia M. Jung, Menlo Park, CA (US)

(73) Assignee: Motorola Solutions, Inc., Schaumburg, IL (US)

( * ) Notice: Subject to any disclaimer, the term of this patent is extended or adjusted under 35 U.S.C. 154(b) by 350 days.

(21) Appl. No.: 11/958,550

(22) Filed: Dec. 18, 2007

(65) Prior Publication Data

US 2009/0154340 A1    Jun. 18, 2009

(51) Int. Cl.
*G06F 11/00* (2006.01)
*H04L 12/26* (2006.01)

(52) U.S. Cl. .................................. 370/216; 370/221
(58) Field of Classification Search .............. 370/216
See application file for complete search history.

(56) References Cited

U.S. PATENT DOCUMENTS

| | | | | |
|---|---|---|---|---|
| 6,728,214 | B1 * | 4/2004 | Hao et al. | 370/241 |
| 7,036,051 | B1 * | 4/2006 | Fernandes | 714/55 |
| 7,065,059 | B1 | 6/2006 | Zinin | |
| 2002/0044526 | A1 * | 4/2002 | Rijhsinghani et al. | 370/227 |
| 2002/0089990 | A1 * | 7/2002 | Rombeaut et al. | 370/395.52 |
| 2003/0193890 | A1 * | 10/2003 | Tsillas et al. | 370/216 |
| 2003/0198221 | A1 * | 10/2003 | Kim et al. | 370/389 |
| 2005/0281192 | A1 * | 12/2005 | Nadeau et al. | 370/217 |
| 2008/0031129 | A1 * | 2/2008 | Arseneault et al. | 370/218 |

FOREIGN PATENT DOCUMENTS

EP    1601140 A2    11/2005

OTHER PUBLICATIONS

J Moy: "OSPF Version 2", Request for Comments: 2328, [Online], Apr. 1998, Retrieved from the Internet: URL: http://www.ietf.org/rfc/rfc2328.txt> [retrieved on Mar. 18, 20090], all pages.

* cited by examiner

*Primary Examiner* — Jason Mattis
*Assistant Examiner* — Stephen J Clawson
(74) *Attorney, Agent, or Firm* — Simon B. Anolick; Anthony P. Curtis; Daniel R. Bestor (57) ABSTRACT

A fast OSPF inactive router detection technique is provided that detects the failure of a router and switches routing to an alternate router. The alternate router provides a message to the other routers in the Wide Area Network (LAN) that informs of the router failure.

21 Claims, 5 Drawing Sheets

| VERSION | TYPE | PACKET LENGTH |
|---|---|---|

| ROUTER ID |
|---|
| AREA ID |

| CHECK SUM | AUTHENTICATION TYPE |
|---|---|

| AUTHENTICATION |
|---|
| AUTHENTICATION |
| NETWORK MASK |

| HELLO INTERVAL | OPTIONS | ROUTER PRIORITY |
|---|---|---|

| ROUTER DEAD INTERVAL |
|---|
| DESIGNATED ROUTER |
| BACKUP DESIGNATED ROUTER |
| NEIGHBOR ID |
| NEIGHBOR ID |
| • • • |

FAST OSPF INACTIVE ROUTER DETECTION

TECHNICAL FIELD

The present invention relates generally to wide area networks, and in particular a method to reduce the amount of time to transfer data communications from one router device to another router device on a wide area network. The present invention relates generally to inactive router detection. More specifically embodiments of the present invention are related to methods that allow for the detection of a failed router device and the switching to an alternate routing device.

BACKGROUND

The Open Shortest Path First (hereinafter "OSPF") protocol is a hierarchical Interior Gateway Protocol (hereinafter "IGP") for routing an internet protocol, using a link-state in the individual areas that make up the hierarchy. A computation based on Dijkstra's algorithm is used to calculate the shortest path tree inside each area.

A Link-State Database (hereinafter "LSDB") is constructed as a tree-image of the network topology, and identical copies of the LSDB are updated periodically on all routers and each OSPF-aware area. The OSPF-aware area is a region of the network included in the OSPF area type. By convention, area 0 represents the core, or the backbone region, of the OSPF-enabled network; and other OSPF area numbers may be designated to serve other reasons of an enterprise network. However, every additional OSPF area must have a direct or virtual connection to the backbone OSPF area.

OSPF is perhaps the most widely used IGP in large enterprise networks. Another protocol, IS-IS, is more common in large service providers networks. The most widely used Exterior Gateway Protocol (hereinafter "EGP") is Border Gateway Protocol (hereinafter "BGP"). The OSPF protocol can operate securely, optionally using a clear text password or using MD5 to authenticate peers before performing adjacencies, and before accepting Link-State Advertisements (hereinafter "LSA"). MD5 is message-digest algorithm 5. MD5 is a cryptography widely used in cryptographic hash function with a 128-bit hash value. MD5 is an internet standard RFC1321. MD5 has been employed in a wide variety of security applications and is also commonly used to check the integrity of files. An MD5 hash is typically expressed as a thirty-two (32) character hexadecimal number. A natural successor to the Routing Information Protocol, OSPF was classless—or able to use variable length subnet masking from its inception. Multicast extensions to OSPF, the multicast open shortest path first protocols, have been identified but these are not widely used at present.

Routers in the same broadcasting domain or at each end of a point-to-point telecommunications link formed adjacencies when they have detected each other. This detection occurs when a router "sees" itself in a hello packet (e.g., reads its own ID in the hello packet). This is called a two way state at its most basic relationship. The routers elect a designated router (hereinafter "DR") and a backup designator router (hereinafter "BDR") which act as a hub to reduce traffic between routers. OSPF uses both unicast and multicast to send "hello packets" and link-state updates. Multicast addresses 224.0.0.5 (all OSPF/link-state routers) and 224.0.0.6 (all designated routers) are reserved for OSPF. In contrast to the routing information protocol or the border gateway protocol, OSPF does not use TCP or UDP, but instead uses IP directly via IP protocol 89. OSPF handles its own error detection and correction. Therefore, OSPF does not need TCP or UDP functions.

An OSPF network is divided into areas, which have a 32-bit area identifiers commonly, but not always, written in the dotted decimal format of an IP address. Area identifiers are not IP addresses, and may duplicate, without conflict, any IP address.

OSPF uses path cost as its basic routing metric, which was defined by the standard not to equate to any standard values such as speed, so that the network designer could pick a metric important to the design. In practice, it is determined by the speed (e.g., bandwidth) of the interface addressing the given route, although that tends to do network specific scaling factors now that links faster than 100 MB per second are common.

However, metrics are only directly comparable when of the same type. There are four types of metrics, with the most preferred types listed in order below. An intra-area route is always preferred to an inter-area route regardless of the metric and so on for the other types.
1. Intra-area;
2. Inter-area;
3. External type 1, which includes both the external path cost and a sum of internal path costs to the autonomous system border routers (hereinafter "ASBR") that advertises the route; and
4. External type 2, the value which is solely that of the external path cost.

OSPF traffic engineering is an extension of OSPF, extending the idea of route preference to include traffic engineering as defined by RFC3630. Traffic engineering extensions to OSPF add dynamic properties to the route calculation algorithm. These properties include maximum reservable bandwidth, unreservable bandwidth, and available bandwidth. OSPF traffic engineering is commonly used within Multiprotocol Label Switching (hereinafter "MPLS") and generalized multiprotocol label switching networks, as a means to determine the topology over which MPLS paths can be established. MPLS then uses its own path setup and forwarding protocols, once it has the full IP routing map. OSPF has the following router types:
1. Area border router (hereinafter "ABR");
2. Autonomous system border router (hereinafter "ASBR");
3. Internal router (hereinafter "IR"); and
4. Backbone router (hereinafter "BR").

The routers are classified by a router type. The router types are attributes of an OSPF process. A given physical router may have one or more OSPF processes. For example, a router that is connected to more than one area, and which receives routes from a BGP process connected to another autonomous system is both an ABR and an ASBR.

An ABR is a router that connects one or more OSPF areas to the main backbone network. The ABR is considered a member of all areas to which it is connected. The ABR keeps multiple copies of the link-state database in memory, one for each area to which the router is connected. The ASBR is a router that is connected to one or more autonomous systems and that exchanges routing information with routers and other autonomous systems. ASBRs typically also run a non-IGP routing protocol (e.g., BGP), or use static routes, or both. The ASBR is used to distribute routes received from other autonomous systems throughout its own autonomous system. The IR router is a router that has only OSPF neighbor relationships with routers in the same area. The backbone router is a router that is part of the OSPF backbone. By definition, this includes all area border routers since those routers pass routing information between areas. However, a backbone router may also be a router that connects only to other backbone routers, and is therefore not part of any other area.

A designated router (hereinafter "DR") is a router interface selected among all routers on a particular multicast network segment, generally assumed to be broadcast multiaccess (i.e., data is made available simultaneously to multiple users or computers). Special techniques, often vendor dependent, may be needed to support the DR function on non broadcast multicasts (hereinafter "NBMA") media. The individual circuits of an NBMA subnet are usually configured as point-to-point lines.

A given physical router can have some interfaces that are designated, others that are backup designated (e.g., a BDR), and others that are non-designated. If no router is a DR or BDR on a given subnet, the BDR is first elected, and then the second election is held if there is more than one BDR. The router winning the second election becomes a DR, or if there is no other BDR, designates itself DR. The DR is elected on the following default criteria:

If the priority setting on an OSPF router is set to 0 that means it can never become a DR or BDR.
When a DR fails and the BDR takes over, there is another election to see who becomes the replacement BDR.
The router sending the hello packets with the highest priority wins the election.
If two or more routers tie with the highest priority setting, the router with the highest router ID wins. A RID is a highest logical IP address configured on the router, if no logical, i.e., loop back IP address, is set and the router uses the highest IP address configured on its active interfaces.
Usually the router with the second highest priority number becomes the BDR
The priority value ranges between 0 and 254, but the higher value increases its chances of becoming the BR or BDR.
If a higher priority OSPF router comes online after the election has taken place, it will not become the DR or BDR until after the DR or BDR fail.

If the current DR goes down the current BDR becomes the new DR and a new election takes place to find another BDR. The new DR then goes down and the original DR is now available, it becomes the DR again, but no change is made to the current BDR.

DRs reduce network traffic by providing a source for routing updates, the DR maintains a complete topology table of the network and sends the updates to other routers via multicast. This way all routers do not have to constantly update each other, and can rather get all their updates from a single source. The use of multicasting further reduces the network load. DRs and BDRs are always set up elected on broadcast networks (e.g., Ethernet LANs.). DRs can also be elected on NBMA (non broadcast multi access) networks such as frame, relay or ATM. DRs or BDRs are not elected on point-to-point links (such as a point-to-point LAN connection) because the two routers on either side of the link must become fully adjacent and the bandwidth between them cannot be further optimized.

A backup designator router BDR is a router that becomes a designated router if the current designated router has a problem or fails. The BDR is the OSPF router with the second highest priority at the time of the last election. Each router has a router identifier, customarily written in the dotted decimal format (e.g., 1.2.3.4) of an IP address. The way in which the router ID is determined is implementation specific. However, the router ID does not have to be a valid IP address, or any IP address, present in the routing domain, although it frequently will be advertised within the domain for trouble shooting purposes.

OSPF can be used on a wide area network (hereinafter "LAN" or "LANs"). LAN is a computer network that covers a broad area (i.e., any network whose communication links cross metropolitan, regional, or national boundaries). The LAN is a long haul connection that is a network that uses routers and public communication links. The internet is one form of LAN and is most notably, the largest.

LANs are used to connect local area networks (hereinafter "LANs" or "LAN") and other types of networks together, so that users and computers in one location communicate with users and computers in another location. Many LANs are built for one particular organization and are private. Others, built by internet service providers (hereinafter "ISPs"), provide connections from an organizations LAN to the internet. LANs are often built using leased lines at each end of the leased line, a router connect the LAN on one side and a hub within the LAN on the other. Leased lines can be very expensive. Instead of using leased lines, LANs can also be built using less costly circuit, switching, or packet switching methods. Network protocols including TCIP deliver transport and addressing functions. Protocols including packet over SONNET/SDH, MPLS, ATM and Frame rarely are used often by service providers to deliver the links that are used in the LAN.

Currently, using OSPF a DR router can not communicate through the LAN to other routers connected to the LAN. All routers send OSPF hello packets once every one second. This hello packet contains within the packet a list of the routers that the originating router can access in a network. If a router fails, then the routers in the network would discover that failure after four seconds. The other routers in the network would then cease to include the failed routers ID within their hello packets. The current OSPF standard specifies this process as establishing a minimum safe duration for "declaring a router" dead. Therefore, the minimum time for discovering a router failure and then rerouting around the failure can take at least four seconds. In some cases, faster timers (Hello timers) are used. For example, a Hello time of zero (0) can be used in certain proprietary systems. However, such systems require that all connected routers utilize the same Request For Comments standard. Typically, the router dead time would be 4 times whatever value is chosen as the Hello interval. However, using this minor departure from the Request For Comments (hereinafter "RFC") standard increases the load on the router. As a result, scalability of the system is limited. What is needed is a method and system to detect and switch around a failed router in less than four seconds in OSPF networks of various sizes.

SUMMARY

In one aspect thereof, an OSPF network with a plurality of routers connected thereto is disclosed. The OSPF network includes a first router associated with a backup, or alternate, router. The first router and the associated backup router can be associated through a device enabled for such associating, such as a Cooperative Wide Area Network Routing module. Failure of the first router results in the virtually instantaneous detection of the failure by the backup router. The backup router then sends a signal instructing the plurality of routers to route around the failed, (i.e., inactive) router. The backup router is further operable to send a probing signal to the first router to determine if the router was only temporarily disconnected from the network.

In an alternate embodiment, the first router and the backup router can be associated through a Virtual Redundancy Routing Protocol. Failure of the router results in the detection of the failure by the backup router within 300 milliseconds. The backup router then sends a signal instructing the plurality of routers to route around the first, i.e., inactive, router. The backup router is further operable to send a probing signal to the inactive router to determine if the first router was only temporarily disconnected from the network.

The plurality of routers on the network are operable to receive the signals, i.e., packets, from the backup router. The plurality of routers can wait a specified duration of time to determine if the first router is inactive. If the plurality of routers determines that the first router is inactive, then the plurality of routers is operable to update their databases and route communication packets around the first, i.e., inactive, router. However, if the plurality of routers determines that the failed router is still active, then the plurality of routers may continue to route communication packets through the first router.

BRIEF DESCRIPTION OF THE DRAWINGS

The accompanying figures, where like reference numerals refer to identical or functionally similar elements throughout the separate views and which together with the detailed description below are incorporated in and form part of the specifications, serve to further illustrate various embodiments and to explain various principals and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the embodiments of the present invention.

DETAILED DESCRIPTION

Before describing in detail embodiments that are in accordance with the present invention, it should be observed that the embodiments reside primarily in combinations of method steps and apparatus components related to a fast OSPF inactive router detection. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship order between such entities or actions. The terms "comprises," "comprising," "includes," "including," or any variation thereof are intended to cover non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of vast OSPF interactive router detection described herein. The non-processor circuits may include, but are not limited to, a radio receiver, a radio transmitter, signal or drivers, clock circuits, power source circuits, and user input devices. As such, these functions may be interpreted as steps of a method to perform fast OSPF router detection. Alternatively, some or all functions could be implemented by a state machine that has no stored program instructions, or in one or more applications specific integrated circuit (ASICS), in which each function or some combinations of certain of the functions are implemented as custom logic. Of course, a combination of the two approaches could be used. Thus, method and means for these functions have been described herein. Further, it is expected that one of ordinary skill in the art, notwithstanding possibly significant effort and many design choices motivated by, for example, available time, current technology, and economic considerations, when guided by the concept and principals disclosed herein, will be readily capable of generating such software instructions and programs and ICs with minimal experimentation. A system and method for detecting and routing around a router failure in a wide area network is disclosed. This system includes a module to detect immediate router failure and switch to an inactive router. This system further includes programming to enable the inactive device to send a message packet to other routers on the LAN informing them that the failed router has been removed. The system also includes programming to enable the inactive router to probe the failed router to determine if a failure truly has occurred.

Methods for fast OSPF inactive router detection includes detecting a failure and switching to an alternate router. The methods further include the alternate router sending a message to all other routers on the LAN informing the routers that the partner router has failed. The method also includes the alternate router probing failed router to confirm that a failure did in fact occur.

A system for fast OSPF inactive router detection includes detecting a failure and switching to an alternate router. The system further includes at least two routers connected through a Cooperative Wide Area Network Routing module. The two routers are associated such that one router is the primary, i.e., active, router and the other is an alternate router. The backup router includes a computer readable code that instructs the backup router, upon the failure of the primary router, to send a message to all other routers on the LAN informing the routers that the primary router has failed. The backup router is also able to probe the failed router to confirm that a failure did, in fact, occur.

Figure 1A:
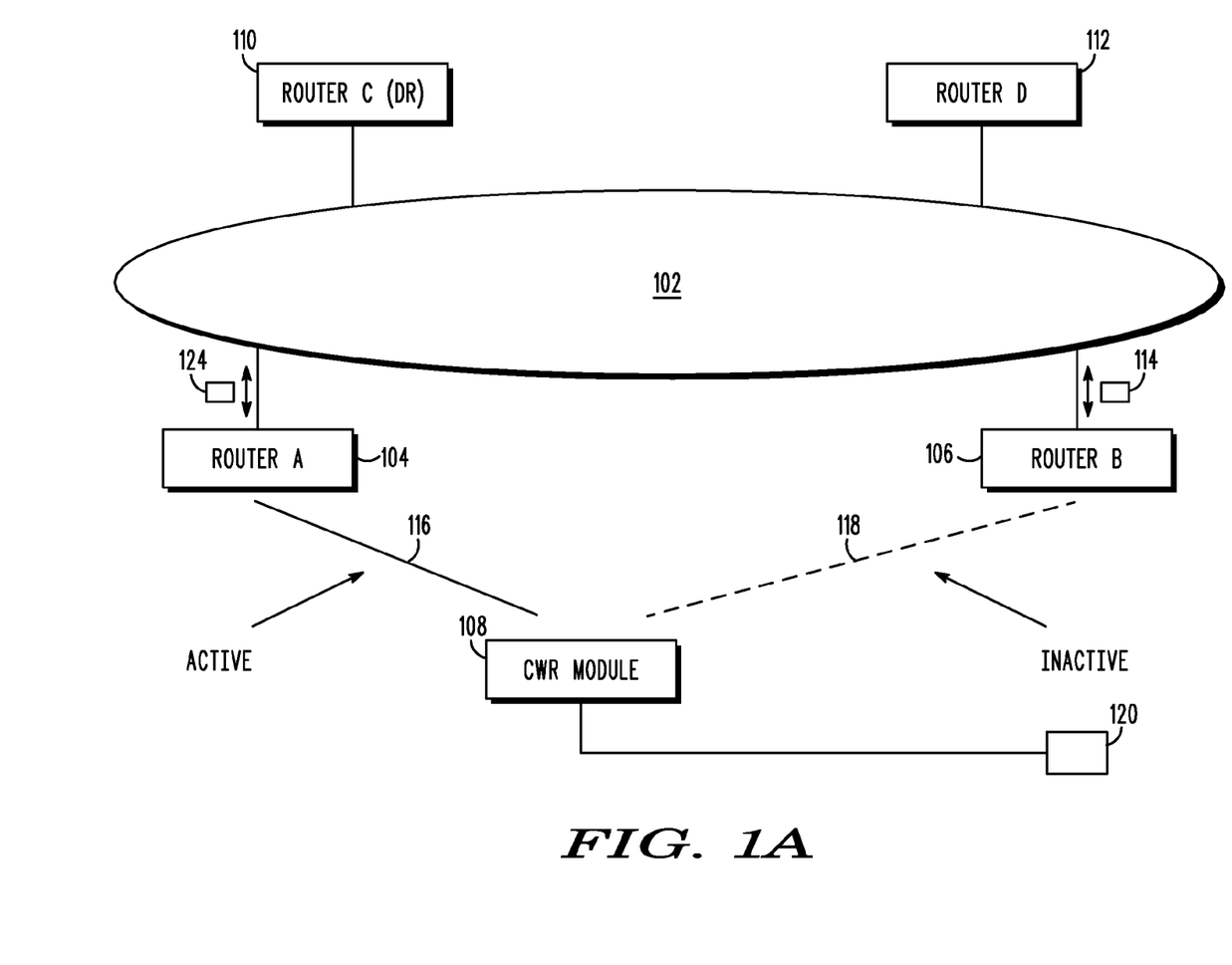
FIG. 1A is an exemplary block diagram of a wide area network with four routers and a cooperative LAN routing module.

Referring now to FIG. 1A, an exemplary local area network (hereinafter "LAN") with a plurality of routers data connected through the LAN is illustrated. The LAN 102 can have a plurality of routers and data connections through it. For example a router A 104 can be data connected through the LAN 102 to communicate with a router C 110 and a router D 112. Additionally, router B 106 can be data connected through the LAN 102 to router C 110 and router D 112. Router A 104 can further be partnered with router B 106. In such a configuration, router B 106 is able to act as a backup to router A 104. In order to "partner" router A 104 with router B 106 so that router B 106 is able to act as a backup to router A 104, router A 104 can be connected through an active link 116 to a cooperative LAN routing module (hereinafter "CWR" module) 108. Additionally, router B 106 can be connected through an inactive data connection 118 to the CWR module 108. As such, router A 104 and router B 106 form a partner relationship through the CWR module 108. The CWR module 108 can further be data connected to another CWR, another router or series of routers or an entirely different LAN 120.

Router A 104 can be an RFC standard router as is known in the art. Router A 104 can include a microprocessor (not shown) and computer readable medium (not shown) to store software programming. Router B 106 can be an RFC standard router as is known in the art. Router B 106 can include a microprocessor and computer readable medium to store software programming. Router A 104 is able to send packets 124 through the LAN 102 to router C 110, or router D 112, or both. Router A 104 and router B 106 are also able to receive packets 114, 124 through the LAN 102. In one embodiment, router A 104 has an active link 116 to the CWR module 108. Additionally, router C 110 and router D 112 communicate through the LAN 102 to router A 104. Router B 106 is a backup router (or alternate router) to router A 104. As such, router B 106 has an inactive link 118 to the CWR module 108. Therefore, router C 110 and router D 112 do not route packets to router B 106 through the LAN 102 (though router C 110 and router D 112 can still communicate with router B 106). Router C 110 and router D 112 can each be RFC standard routers as is known in the art. Additionally, router C 110 and router D 112 can contain the microprocessors and computer readable medium to store programming as described with respect to router A 104 and router B 106. Artisans of ordinary skill will appreciate that four routers have been shown for simplicity and many more routers can be connected to the LAN 102. A computer readable medium is any electronic, magnetic, electromagnetic, optical, electro-optical, electromechanical, and/or other physical device that can contain, store, communicate, propagate, or transmit a computer program, software, firmware, or data for use by the microprocessor or other computer-related system or method.

Figure 1B:
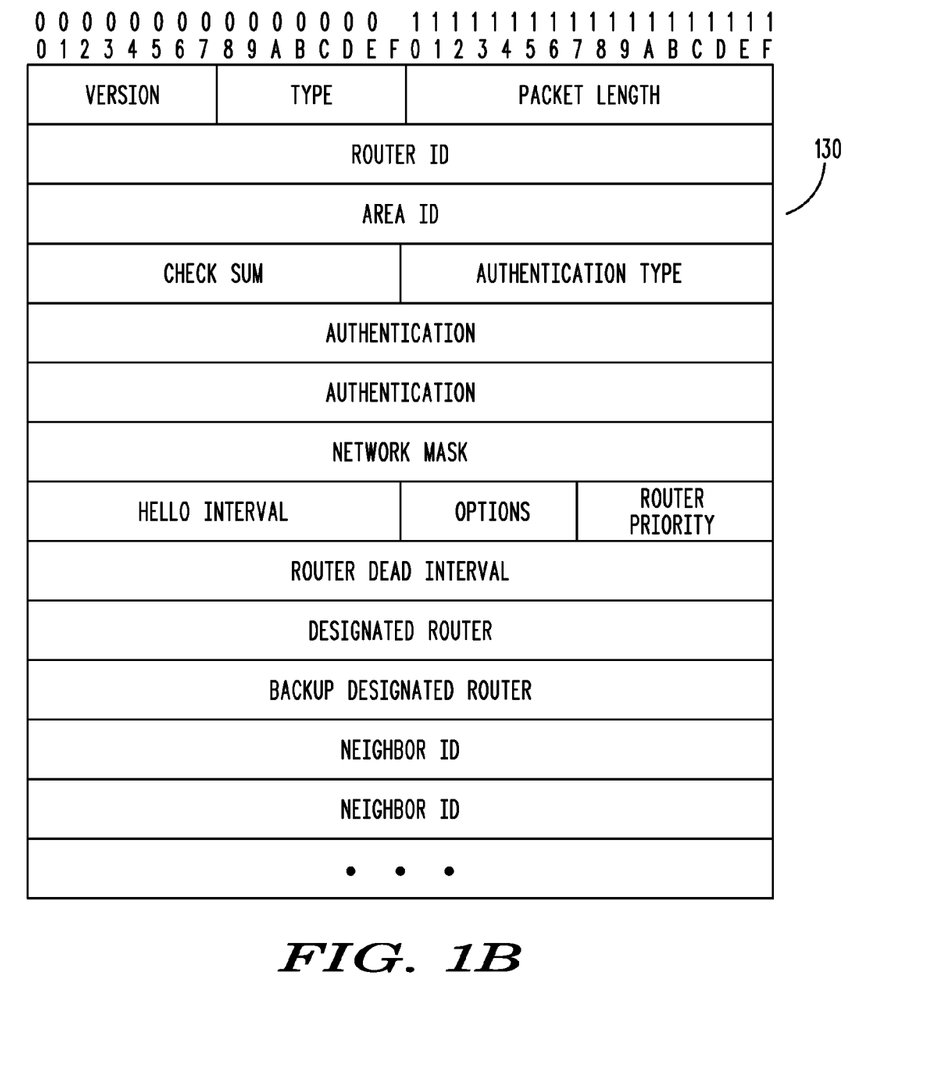
FIG. 1B is an exemplary hello packet in accordance with embodiments of the present invention.

As stated herein above, router A 104 transmits packets 124 through the LAN 102 to router C 110 or router D 112 or both. In accordance with OSPF protocol, router A 104 sends the communication packet 124 once per second. The communication packet 124 contains, within it, a plurality of information, including router A's ID, the area ID as well as the IDs of the routers that router A 104 is in data communication with (e.g. the routers that router A 104 "sees"). The communication packets 124 may also be referenced as hello packets. Additionally, router C 110 and router D 112 send out hello packets once every second. An exemplary hello packet 130 is illustrated in FIG. 1B.

The CWR module 108 can be a standard CWR module. The CWR module 108 contains the unique ability to detect a failure on a router in data connection with the CWR module 108. As such, should router A 104 fail, the CWR module 108 is able to substantially instantaneously, i.e., within one (1) millisecond to ten (10) milliseconds detect the failure of router A 104. Therefore, upon the failure of router A 104, the CWR module 108 virtually instantaneously (i.e., substantially instantaneously) switches the active link 116 to an inactive state and switches the inactive link 118 to an active link. Therefore, router A 104 will no longer have an active link to the CWR module 108; whereas, router B 106 will now have an active link to the CWR module 108 through the previously inactive link 118. Thereafter, all communication from the CWR module 108 is passed through the, now, active link 118 to router B 106.

Router C 110 can be a designated router ("DR") on the LAN 102. As stated herein above, the DR is a router interface selected among all of the routers on a particular multi-access network segment, generally assumed to be the broadcast multi-access. The DR reduces network traffic by providing a source for routing updates. The DR maintains a complete topology table of the network and sends the updates to the other routers via multicast. Therefore, all routers do not have to constantly update each other over the LAN 102, and can rather get all of their updates from a single source, that source being the DR. The use of multicasting further reduces the network load.

When router A 104 fails, router B 106, as the alternate or partner router, is able to detect the failure of router A 104, just as the CWR module 108 was able to detect the failure of router A 104. Router B 106 is able to detect that router A 104 has failed due to the connection that router A 104 and router B 106 have through the CWR module 108. Thereafter, router B 106 sends a message packet 114 (e.g. a hello packet) through the LAN 102 to the DR router C 110 and the router D 112, as well as to all other routers on the LAN 102. The OSPF hellos are sent to all routers on the LAN. Therefore, the hello packets may also act as a "probe" packet. Router B 106 sends the hello packet 114 to the DR router C 110 and the router D 112 within one-hundred (100) milliseconds to one-thousand (1,000) milliseconds of the failure of router A 104. Router B 104 sends the hello packet 114 to the DR router C 110 and router D 112 in order to update the routers connected to the LAN 102 that router A 104 is inactive. For example, when router B 106 detected that router A 104 had failed, router B 106 removed the ID for router A 104 from its hello packet 114. As such, the hello packet 114, sent from router B 106, does not contain the ID for router A 104. When the DR router C 110 receives the hello packet 114 from router B 106, the DR router C 110 is able to determine that router B 106 is no longer advertising that router A 104 is available. Router B 106 sends a hello packet (e.g., as a probing message), through the CWR module 108, to router A 104. This hello packet (e.g., probing message) is a query to router A 104 to confirm that router A 104 is, in fact, inactive. If router A 104 is still active, for example, if the link to router A 104 was briefly interrupted but has re-established and router A 104 still is active, then router A 104 can send a hello packet 124, through the LAN 102, to the DR router C 110. Additionally, router B 106 would receive this hello packet 124 through the LAN 102. If router A 104 sends this hello packet 124, and the DR router C 110 receives the hello packet 124 from router A 104 within about two-hundred (200) milliseconds to one-thousand (1,000) milliseconds from when DR router C 110 received the hello packet 114 from router B 106, then the DR router C 110 would ignore the hello packet 114 received previously from router B 106. If however, router A 104 does not send its hello packet 114 through the LAN 102 to the DR router C 110, or the DR router C 110 does not receive the router A 104 hello packet 124 within the two-hundred (200) milliseconds to one-thousand (1,000) milliseconds, then the DR router C 110 would send a network link state advertisement (hereinafter "LSA"). The LSA is a basic communication means of the OSPF routing protocol for IP. The LSA transports a router's local routing topology to all other local routers in the same OSPF area. Since OSPF is designed for scalability, so some LSAs are not sent out on all interfaces, but only are sent on those that belong to the appropriate area or those that have been selected as designated router (DR). In this way detailed information can be kept localized, while summary information is flooded to the rest of the network. The network LSA would not contain router A 104 within its list of available routers. The new network LSA would cause all other routers to remove router A 104 from their databases and route around router A 104. Thereafter, all routers 110, 112 on the LAN 102 would not communicate to router A 104, but instead, would be communicating through router B 106. Thus, the switching of data communications from router A 104 to router B 106 can be accomplished within 300 milliseconds.

Figure 2:
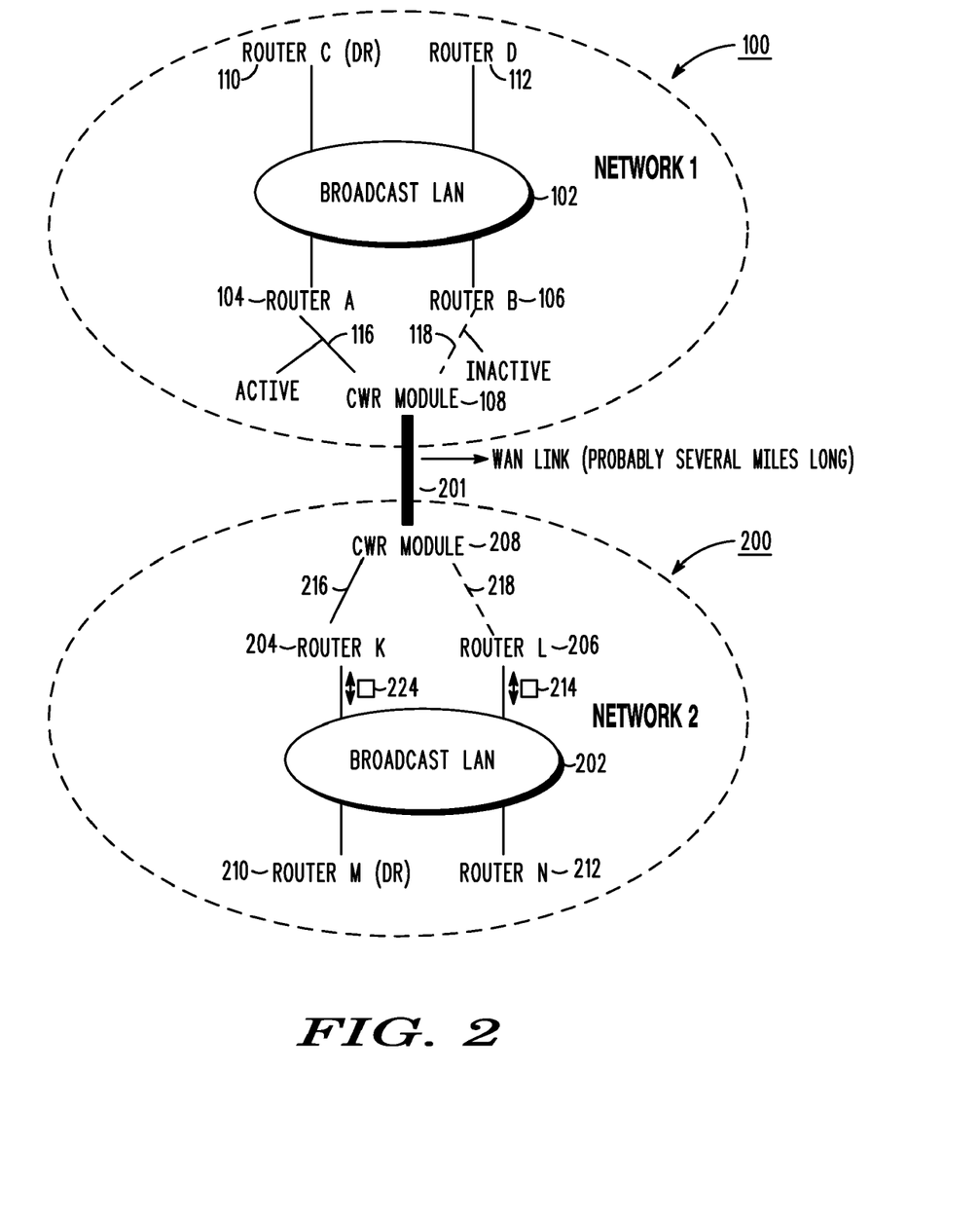
FIG. 2 is an exemplary block diagram of two wide area networks connected through the CWR modules.

Referring now to FIG. 2, an exemplary block diagram depicting two networks in accordance with embodiments of the present invention is shown. Network 1 100 can be connected via a LAN link 201 to network 2 200. The LAN link 201 can be a short distance, i.e., within the same building, or the LAN link 201 can be several miles long. A CWR module 108 in network 1 100 connects via the LAN link 201 to a CWR module 208 in network 2 200. As described herein above with respect to FIG. 1, network 1 100 shows a LAN 102 with a plurality of routers 104, 106, 112, and 110. A DR router C 110 is connected to the LAN 102. Additionally, router A 104 and router B 106 are connected to the CWR module 108. Router A 104 is connected via an active link 116 to the CWR module 108 while router B 106 is connected via an inactive link 118 to the CWR module 108. As with network 1 100, network 2 200 can contain a LAN 202 with a plurality of routers 204, 206, 210, 212 connected thereto. Network 2 200 could have a DR router M 210 as well as a number of routers N 212. Artisans in the skill will appreciate that a single router N 212 is depicted, but a plurality of routers can exist. Router K 204 and router L 206 are additionally connected to the LAN 202. Router K 204 is connected via an active link 216 to CWR module 208. Router L 206 is connected via an inactive link 218 to CWR module 208. As such, router L 206 is a backup, or alternate router, to router K 204. Should router K 204 fail, router L 206 will be able to detect the failure of router K 204, via the link through the CWR module 208. Router K 204 is similar in design and structure to router A 104 and router L 206 is similar to design and structure to router B 106. The CWR module 208, as with the CWR module 108, has a unique ability to virtually instantaneously detect the failure of router K 204. As such, router L 206 would remove router K 204 from its hello packet 214. Router L 206 would send a hello packet 214 through the LAN 202 to the DR router M 210 and router N 212. Router L 206 would also send a probing packet through the CWR module 208 to router K 204. If router K 204 sends this hello packet 224, and the DR router M 210 receives the hello packet 224 from router K 204 within about two-hundred (200) milliseconds to one-thousand (1,000) milliseconds from when DR router M 210 received the hello packet 214 from router L 206, then the DR router M 210 would ignore the hello packet 214 received previously from router L 206. If router K 204 does not respond with a hello packet 224, or DR router M 210 does not receive the hello packet 224 from router K 204, within about two-hundred (200) milliseconds to one-thousand (1,000) milliseconds from when DR router M 210 received the hello packet 214 from router L 206, then the DR router M 210 would send a network LSA to remove router K 204 from its list. The new network LSA would cause all of the routers on the network 2 200 to remove router K 204 from their databases and route around router K 204. As with network 1 100 described herein above with respect to FIG. 1a, if router K 204 fails, the CWR module 208 switches the active link 216 to router K 204 to an inactive link and switches the inactive link 218 to router L 206 to be an active link. Therefore, any messages sent from network 1 100 through the CWR module 108 to the CWR module 208 will be routed through router L 206 to the network 2 LAN 202.

Figure 3:
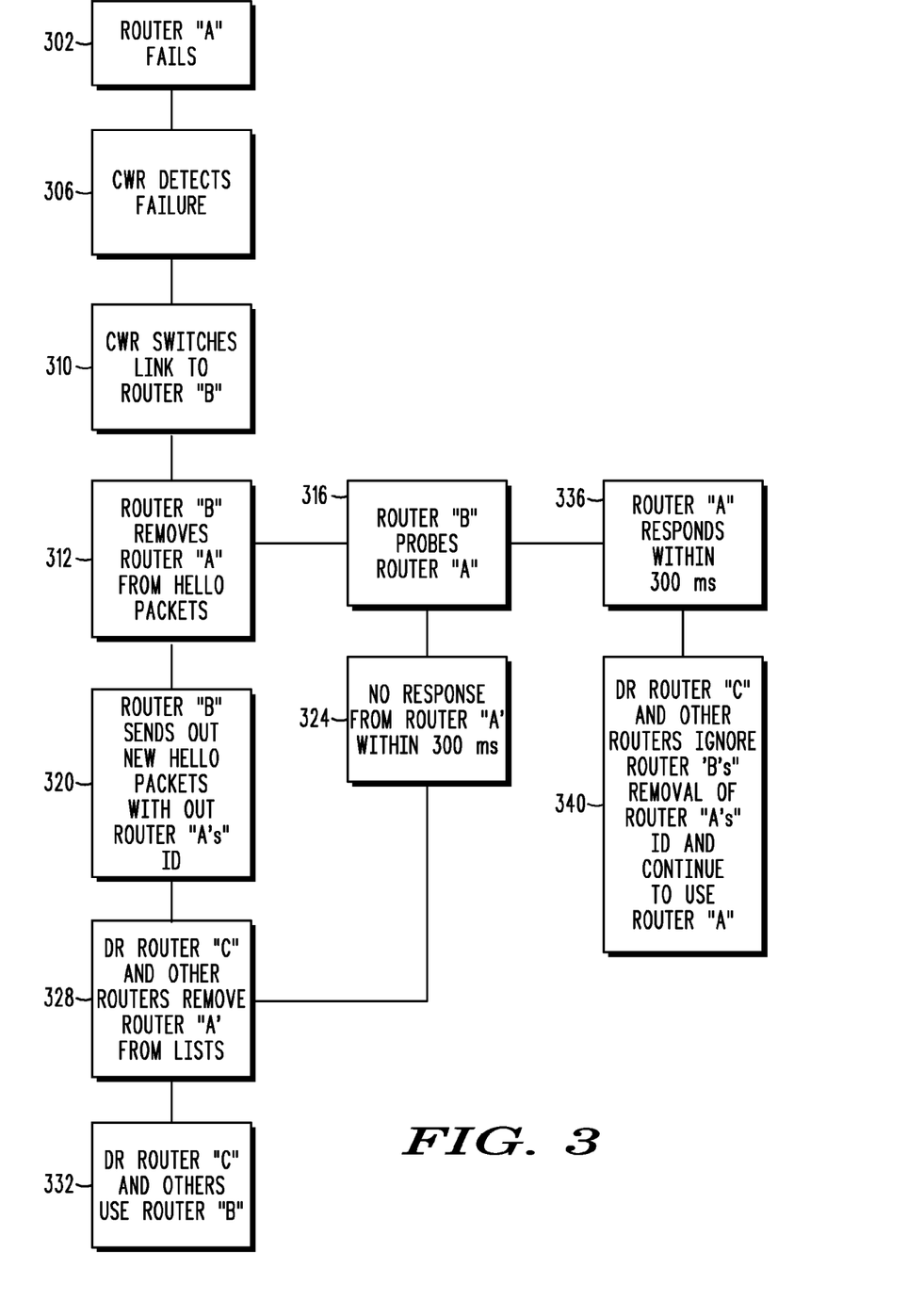
FIG. 3 is a flow chart for detecting and switching around a router failure in accordance with embodiments of the present invention.

Referring now to FIG. 3, an exemplary flow chart diagram depicting fast OSPF inactive router detection is illustrated. A LAN, as described with respect to FIG. 1A and FIG. 2, contains a plurality of routers. The LAN has attached thereto, a pair of routers A and B, as illustrated in FIG. 1. Router A fails in step 302. Thereafter the CWR 108 detects the failure in step 306. Router B 106 detects the failure through the CWR. The CWR switches the link to router B in step 310. In this step, the CWR makes the active link 116 to router A 104 inactive and makes the inactive link 118 to router B active. Thereafter, router B removes router A from its hello packets in step 312. Router B, additionally, in step 316, sends a probe to router A. The probe sent by router B can be a hello packet sent by router B to router A. Concurrently, router B sends out a new hello packet without router A's ID contained within the hello packet in step 320. Thus, router B is no longer advertising that router A is available. In one scenario, in step 324, router A does not respond within 300 milliseconds to router B's probe from step 316. As such, DR router C does not receive a hello packet from router A within 300 milliseconds from when DR router C received the hello packet from router B sent in step 320. Therefore, in step 328, the DR router C removes router A from DR router C's list. The DR router C then sends a network LSA that would remove router A from DR router list as well as cause all other routers to remove router A from their databases. Then, at step 332, the DR router C and the other routers connected to the LAN 102 route around router A 104.

In a separate scenario, instead of router A failing to respond, as it did in step 324, router A responds to the probe received from router B within 300 milliseconds of when router A received the probe packet from router B, shown step 336. Router A sends its hello packet within three-hundred (300) milliseconds go one-thousand (1,000) milliseconds) to the DR router C after router A received the probe packet from router B. The DR router C receives the packet within three (300) milliseconds to one-thousand (1,000) milliseconds) from when DR router C received the hello packet from router B sent in step 320. Thereafter in step 340, the DR router C ignores the hello packet that was sent by router B in step 312. As such, the DR router C and the router D continue to communicate through the LAN to router A. This would be a situation in which the link to router A was just temporarily interrupted. The temporary interruption may be a condition in which router A is unable to communicate or send and receive packets for a duration of within three-hundred (300) milliseconds (to one (1) second).

Figure 4:
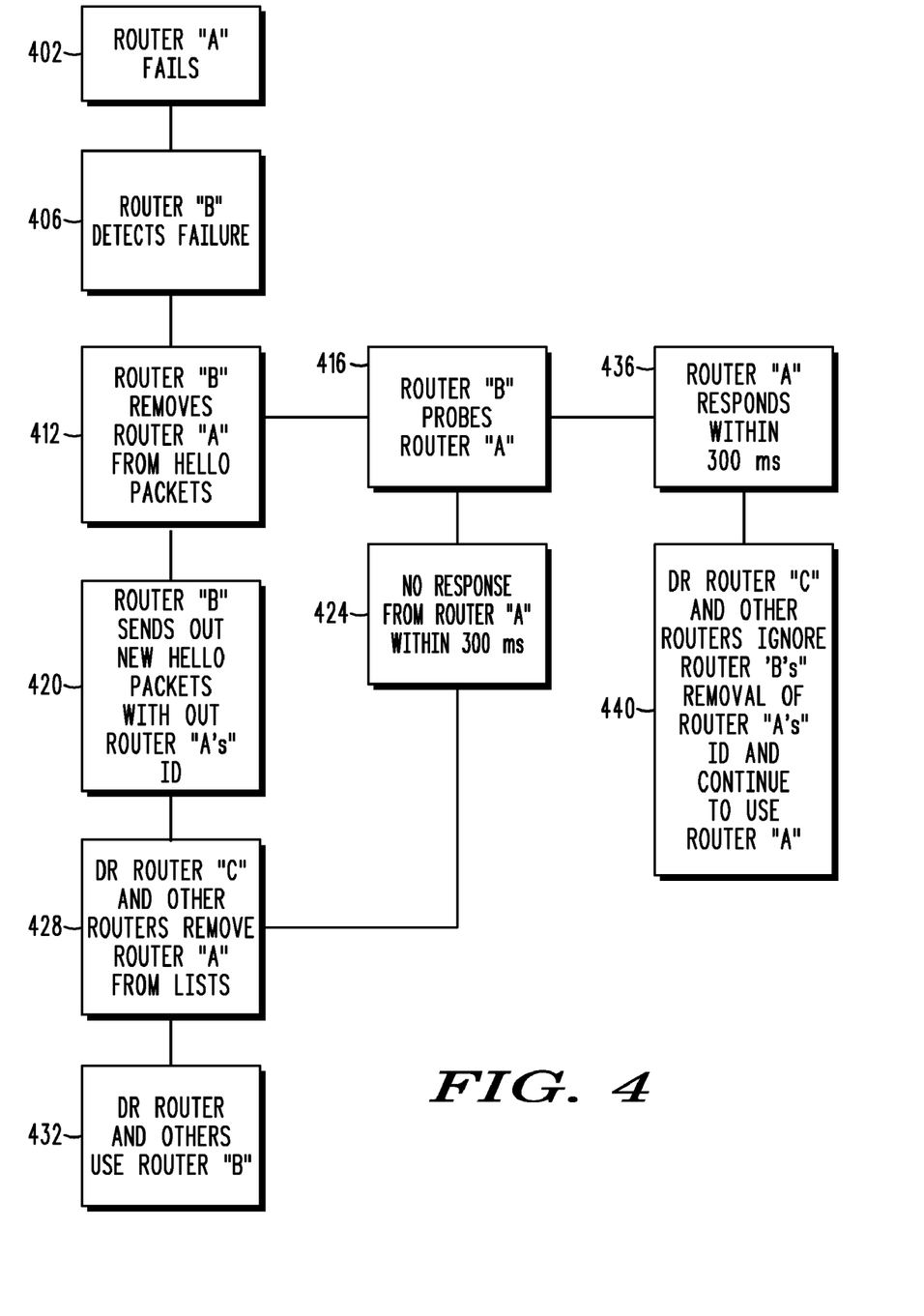
FIG. 4 is a flow chart for detecting and switching around a router failure using virtual router redundancy protocol in accordance with embodiments of the present invention.

Referring now to FIG. 4 an exemplary flow chart illustrating another embodiment of the fast OSPF inactive router detection process using a Virtual Router Redundancy Protocol (hereinafter "VRRP") is illustrated. Instead of being connected through the CWR module 108, router A 104 and router B 106 can be data coupled through a virtual router redundancy protocol (VRRP). VRRP is a non proprietary redundancy protocol described in RFC 3768 (Request For Comments Standard 3768) designed to increase the availability of the default gateway servicing hosts on the same subnet. This increase for liability is achieved by advertising a "virtual router." A virtual router is an abstract representation of master and backup routers acting as a group. The increase for liability is further achieved by advertising a default gateway to the hosts instead of one physical router. Two or more physical routers are then configured to stand for the virtual router, with only one doing the actual routing at any given time. If the current physical router that is routing the data on behalf of the virtual router fails, then arrangement is made for another physical router to automatically replace it. The physical router that is currently forwarding data on behalf of the virtual router is called the master router. Physical routers standing by to take over from the master router in that case that something goes wrong are called backup routers.

VRRP is able to be used over the Ethernet, MPLS and token ring networks. VRRP is a protocol that provides information on the state of a router, not the routes processed and exchanged by that router. Each VRRP instance is limited, in scope, to a single subnet. VRRP does not advertise IP routes beyond that subnet. VRRP does not affect the routing table in any way.

A failure to receive a multicast packet from the master router for a period longer than 3 times an advertisement timer causes the backup router to assume that the router is dead. The advertisement timer is a timer established for a router to receive the advertisement regarding the virtual router. The virtual router then transitions into an unsteady state and an election is initiated to select the next master router from the list of backup routers. The network uses multicast packets to accomplish this task.

Backup routers only send multicast packets during an election process. One exception to this rule is when a physical router is configured to always supersede the current master after it has been introduced into the virtual router. This allows the system administrator to force a physical router to the master state immediately after booting, for example, when the particular router is more powerful than others within the virtual router or when the particular router uses the least expensive bandwidth. The backup router with the highest priority becomes the master router by raising its priority to 255 and sending address resolution protocol packets within the virtual MAC address and its physical IP address. This redacts the hosts packets from the superseded master router to the current master router. In cases where backup routers all have the same priority, the backup router with the highest IP address becomes the master router.

For the purposes of this flow chart, router A 104 is the master router and router B 106 is the backup router. Router A fails at step 402. Thereafter, router B detects the failure 406. Router B is able to detect that router A has failed within two-hundred (200) milliseconds (to one-thousand (1,000) milliseconds) after the failure of router A. In step 412, router B removes router A from the hello packets router B sends. This hello packet is broadcast and is seen by DR router C and will be seen by route A if it is still active. Therefore, as described herein above with respect to step 320 of FIG. 3, router B is now advertising that router A is now inactive. As shown in step 424, if router A fails to respond to the probe from router B within three-hundred (300) milliseconds (to one-thousand (1,000) milliseconds) from when router A received the hello packet from router B in step 420 (or should DR router C not receive the hello packet from router A within 300 milliseconds from when DR router C received the hello packet from router B in step 420 i.e., 400 milliseconds from the failure of router A); then, in step 428 the DR router C will send a network LSA to remove router A from the DR router list. The new network LSA would cause all other routers to remove router A from their databases. Thereafter in step 432 the DR router C and the other router would route around router A and via router B.

However as shown in step 436, should router A respond with a hello packet, and DR router C receive the hello packet from router A, one-hundred (100) milliseconds to one-thousand (1,000) milliseconds from when DR router C received the hello packet from router B in step 420, then in step 440 DR router C would ignore the hello packet sent by router B in step 420. As such, all the routers on the network would ignore the request form router B to route around router A and continue routing through router A. This would be a situation in which the link to router A was just temporarily interrupted.

Therefore, instead of using the CWR module 108, router A and router B can be partnered using a VRRP session. Using a VRRP session between router A and router B, fast OSPF inactive router detection can still be achieved. However, in this case, router B would detect that router A has failed within one-hundred (100) milliseconds (to one-thousand (1,000) milliseconds) as opposed to the virtually instantaneous response through the CWR module. Therefore, including the one-hundred (100) milliseconds (to one-thousand (1,000) milliseconds) delay in step 428, where the DR router awaits a response from router A, responding to the probe in step 416, the total time to reroute OSPF would be approximately four-hundred (400) milliseconds (to one-thousand-three-hundred (1,300) milliseconds). This is still a substantial improvement over the 4 second reroute time of the current standards.

Artisans of ordinary skill would understand that OSPF has been described for exemplary purposes. A similar system can be established using the Intermediate System to Intermediate System (hereinafter "IS-IS"). IS-IS is a protocol for network routers to determine the best way to forward data grams or packets to a packet based network. IS-IS is an interior gateway protocol (hereinafter "IGP") meaning that it is intended for use within an administrative domain or network. IS-IS is not intended for routing between networks or administrative domains, a job which is the purpose of an exterior gateway protocol such as border gateway protocol (BGP).

IS-IS is a link-state routing protocol. Therefore, IS-IS operates by reliably flooding topology information via a network of routers. Each router then independently builds a picture of the networks topology. Packets or data grams are forwarded based on the best topological path through the network to the destination. IS-IS, as with OSPF, uses Dijkstra's algorithm for identifying the best path through the network. Since both IS-IS and OSPF are link-state routing protocols that use Dijkstra's algorithm, IS-IS and OSPF are conceptually similar. Both support variable length subnet masks, can use multicast to discover neighboring routers using hello packets, and can support authentication of routing updates.

While OSPF is natively built to route IP and is itself a layer 3 protocol that runs on top of IP, IS-IS is natively, an ISO-CLNS protocol. IS-IS does not use IP to carry routing information messages. IS-IS routers use a topological representation of the network. This map indicates that IP subnets that each IS-IS router can reach, and the shortest path to an IP subnet is used to forward IP traffic. IS-IS also differs from OSPF in the methods by which it reliably floods topology and topology change in information through the network. However, the basic concepts are similar. Ultimately, IS-IS can support more routers in an area than OSPF.

IS-IS differs from OSPF in the way that areas are defined and routed between. IS-IS routers are designated as being level 1 intra-area, level 2 inter-area, or level 1 and 2, both. Level 2 routers are inter-area routers that can only form relationships with other level 2 routers. Routing information is exchanged between level 1 routers and other level 1 routers and level 2 routers only exchange information with other level 2 routers. Level 1-2 routers exchange information with both levels and are used to connect the inter-area routers within the intra-area routers.

As such, with minimal programming changes from the routers of the OSPF network, the routers can perform the same functions described herein above with respect to FIGS. 1A, 1B, 2, 3, and 4 in the IS-IS network.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Benefits, advantages, solutions to problems, and any elements that may cause any benefit, advantages or solution to occur or become more pronounced are not to be construed as a critical, required, or essential features or elements of any or all of the claims. The invention is defined solely by the appended claims including any amendments made during the pendency of this application and all equivalent to those claims as issued.

We claim:

1. A system for rerouting communication packets from a failed router to an alternate router in a Wide Area Network LAN, said system comprising:
   a first router in data connection to said LAN, said first router comprising:
      a first processor; and
      a first computer readable medium electronically coupled to said first processor;
   a second router in data connection to said LAN, said second router comprising:
      a second processor; and
      a second computer readable medium electronically coupled to said second processor;
   a plurality of routers data connected to said LAN and to said first and second routers;
   said first processor being in data communication with said second processor; and
   a plurality of instructions wherein at least a portion of said plurality of instructions are storable in said second computer readable medium, and further wherein said plurality of instructions are configured to cause said second processor to perform the steps of:
      detecting a failure of said first router;
      removing an ID of said first router from a communication packet;
      sending in response to having detected failure of said first router a probe packet to said first router to confirm failure of said first router; and
      sending said communication packet to at least one of said plurality of routers in response to having detected failure of said first router, said communication packet instructing said at least one of said plurality of routers to switch further data communications from said first router to said second router if said at least one of said plurality of the routers does not receive a response to said probe packet from said first router within a predetermined time range.

2. The rerouting system of claim 1, wherein said at least one of said plurality of routers removes said ID of said first router from a communication list; and said at least one of said plurality of routers inserts ah ID of said second router into said communication list.

3. The rerouting system of claim 1, wherein said first router comprises a first plurality of instructions wherein at least a portion of said plurality of instructions are storable in said first computer readable medium, and further wherein said plurality of instructions are configured to cause said first processor to perform the steps of:
   receiving said probe packet; and
   responding to said probe packet with a response packet to said second router and said at least one of said plurality of routers, said response packet indicating said failure has not occurred.

4. The rerouting system of claim 3, wherein said at least one of said plurality of routers ignores said communication packet upon receiving said response packet from said first router.

5. The rerouting system of claim 4, wherein the at least one of the plurality of routers includes a designated router that ignores the communication packet if the response packet is received from the first router within a predetermined duration of time from when the communication packet was received, the designated router sending a network link state advertisement after the predetermined duration of time, the network link state advertisement containing the ID of the first router if the response packet is received from the first router within the predetermined duration of time and not containing the ID of the first router if the response packet is not received from the first router within the predetermined duration of time, the predetermined duration of time being specifically determined to permit response by the first router.

6. The rerouting system of claim 1, further comprising a Cooperative LAN Routing module, CWR module, connected between said first router and said second router, said CWR module operable to detect said failure of said first router and in response perform a switching operation to switch a data communication path from said first router to said second router.

7. The rerouting system of claim 6, wherein said CWR module performs said switching operation without user intervention.

8. The rerouting system of claim 7, wherein said CWR module performs said switching operation within a range of one to five milliseconds after said occurrence of said failure of said first router.

9. The rerouting system of claim 6, wherein said CWR module performs said switching operation with user intervention.

10. The rerouting system of claim 1, wherein said data couple between said first router and said second router comprises a Virtual Router Redundancy Protocol.

11. The rerouting system of claim 1, wherein said at least one of said plurality of routers is a Designated Router.

12. A method for rerouting data communications from a failed router to an alternate router in a Wide Area Network, LAN, using an Open Shortest Path First protocol, OSPF, said method comprising:
   detecting a failure, by a second router on the LAN, of a first router on the LAN;
   removing an ID of the first router, by the second router, from a communication packet;
   sending the communication packet, by the second router, to at least one of a plurality of routers on the LAN other than the first and second routers in response to having detected failure of said first router;

sending a probe packet, by the second router in response to having detected failure of the first router, to the first router to confirm failure of said first router;

receiving, by the at least one of the plurality of routers, the communication packet;

wherein the communication packet informs the at least one of the plurality of the routers that the first router is unavailable and that further communications should switch from the first router to the second router if the at least one of the plurality of the routers does not receive a response to the probe packet from said first router within a predetermined time range.

13. The rerouting method of claim 12, further comprising:

responsive to the at least one of the plurality of routers failing to receive the response to the probe packet from the first router within the predetermined time range, the at least one of the plurality of routers confirming the unavailability of the first router and causing further communications to occur with the second router.

14. The rerouting method of claim 12, further comprising:

sending, by the first router, a response packet, wherein the response packet is sent in response to the probe packet and wherein the response packet informs the second router and the at least one of the plurality of routers that the first router is still available.

15. The rerouting method of claim 14, further comprising:

receiving, by the at least one of the plurality of routers, the response packet from the first router; and ignoring, by the at least one of the plurality of routers, the communication packet received from the second router, wherein the response packet is received within a predetermined time.

16. The rerouting method of claim 12, further comprising:

detecting, by a Cooperative LAN Routing module, CWR module, the failure of the first router prior to the second router detecting the failure of the first router; and switching, by the CWR module, a data communication path from the first router to the second router in response to the occurrence of the failure of the first router.

17. The rerouting method of claim 16 wherein switching, by the CWR module, is performed without user intervention.

18. The rerouting method of claim 17, wherein switching, by the CWR module, is performed substantially instantaneously after the occurrence of the failure of the first router.

19. The rerouting method of claim 16, wherein switching, by the CWR module, is performed with user intervention.

20. The rerouting method of claim 12, wherein the first router and the second router are data coupled through a Virtual Router Redundancy Protocol.

21. The rerouting method of claim 12, wherein the at least one of the plurality of routers is a Designated Router.

* * * * *

UNITED STATES PATENT AND TRADEMARK OFFICE
CERTIFICATE OF CORRECTION

PATENT NO.       : 8,068,409 B2
APPLICATION NO.  : 11/958550
DATED            : November 29, 2011
INVENTOR(S)      : Kumaresan et al.

Page 1 of 1

It is certified that error appears in the above-identified patent and that said Letters Patent is hereby corrected as shown below:

On the title page, item (56), under "OTHER PUBLICATIONS", in Column 2, Line 3, delete "Mar. 18, 20090]," and insert -- Mar. 18, 2009], --, therefor.

In Column 10, Line 42, delete "go" and insert -- (to --, therefor.

In Column 10, Line 44, delete "three" and insert -- three-hundred --, therefor.

In Column 10, Line 45, delete "to" and insert -- (to --, therefor.

In Column 14, Line 2, in Claim 2, delete "ah ID" and insert -- an ID --, therefor.

Signed and Sealed this
Eighteenth Day of December, 2012

David J. Kappos
*Director of the United States Patent and Trademark Office*